United States Patent
Crane et al.

(10) Patent No.: US 10,955,524 B2
(45) Date of Patent: Mar. 23, 2021

(54) SYSTEM AND TECHNIQUE FOR MITIGATION OF CLUTTER IN RADAR

(71) Applicant: Massachusetts Institute of Technology, Cambridge, MA (US)

(72) Inventors: Molly K. Crane, Belmont, MA (US); David C. Mooradd, Ipswich, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 520 days.

(21) Appl. No.: 15/820,617

(22) Filed: Nov. 22, 2017

(65) Prior Publication Data
US 2018/0143295 A1   May 24, 2018

Related U.S. Application Data

(60) Provisional application No. 62/425,216, filed on Nov. 22, 2016.

(51) Int. Cl.
| | | |
|---|---|---|
| G01S 7/292 | (2006.01) | |
| G01S 13/524 | (2006.01) | |
| G01S 7/41 | (2006.01) | |
| G01S 13/02 | (2006.01) | |
| G01S 7/02 | (2006.01) | |

(52) U.S. Cl.
CPC ............. *G01S 7/2922* (2013.01); *G01S 7/02* (2013.01); *G01S 7/024* (2013.01); *G01S 7/025* (2013.01); *G01S 7/292* (2013.01); *G01S 7/2923* (2013.01); *G01S 7/414* (2013.01); *G01S 7/415* (2013.01); *G01S 13/0218* (2013.01); *G01S 13/5244* (2013.01); *G01S 13/5246* (2013.01); *G01S 13/5248* (2013.01); *G01S 7/026* (2013.01); *G01S 13/0209* (2013.01); *G01S 2013/0227* (2013.01)

(58) Field of Classification Search
CPC .... G01S 7/2922; G01S 13/5246; G01S 7/414; G01S 13/0218; G01S 7/415; G01S 13/5248
USPC ..................................................... 342/26, 93
See application file for complete search history.

(56) References Cited

U.S. PATENT DOCUMENTS

| | | | |
|---|---|---|---|
| 4,231,037 A | 10/1980 | Long | |
| 4,766,435 A | 8/1988 | Wells | |
| 4,928,131 A | 5/1990 | Onozawa | |
| 7,796,082 B2 | 9/2010 | Wood | |
| 8,174,435 B2 | 5/2012 | Habboosh et al. | |
| 8,456,350 B2 | 6/2013 | Wood | |

(Continued)

FOREIGN PATENT DOCUMENTS

WO    WO 2005/052630 A2    6/2005

OTHER PUBLICATIONS

Crane, et al.; "A Polarization Technique for Mitigating Low-Grazing-Angle Radar Sea Clutter;" IEEE MTT-S International Microwave Symposium (IMS), Jun. 2017; 3 pages.

(Continued)

*Primary Examiner* — Bo Fan
(74) *Attorney, Agent, or Firm* — Daly, Crowley, Mofford & Durkee, LLP (57) ABSTRACT

Described are a system and technique to mitigate the impacts of clutter in a radar system. The system and technique require only linear co-polarized measurements can be incorporated into the standard radar signal processing chain without slowing down radar performance.

15 Claims, 11 Drawing Sheets

(56) References Cited

U.S. PATENT DOCUMENTS

| | | | |
|---|---|---|---|
| 8,776,968 | B2 | 7/2014 | Higby |
| 9,297,886 | B1 | 3/2016 | Mountcastle et al. |
| 2007/0222661 | A1* | 9/2007 | Stagliano, Jr. .......... G01S 7/025 |
| | | | 342/26 R |
| 2009/0096662 | A1 | 4/2009 | Wang et al. |
| 2016/0061948 | A1 | 3/2016 | Ton et al. |
| 2018/0143295 | A1* | 5/2018 | Crane .................... G01S 7/414 |

OTHER PUBLICATIONS

Massachusetts Institute of Technology; Tech Notes; "Polarimetric Co-location Layering;" www.II.mit.edu; Dec. 2016; 2 pages.

Antipov; "Simulation of Sea Clutter Returns;" Technical Report; DSTO-TR-0679; Defense Science and Technology Organization; Jun. 1998; 71 pages.

Boerner; "Recent Advances in Radar Polarimetry and polarimetric Sar Interferometry"; Radar Polarimetry and Interferometry (pp. 12-1-12-30); Education Notes RTO-EN-SET; Jan. 2007; 31 pages.

Chan; "Radar Sea-Clutter at Low Grazing Angles;" IEEE Proceedings; vol. 137:2; pp. 102-112; IET; Apr. 1990; 11 pages.

Currie, et al.; "Time-Varying Spectra for Dual-Polarized Radar Returns from Targets in an Ocean Environment;" Record of the IEEE 1990 International Radar Conference; May 7-10, 1990; 5 pages.

Davey, et al.; "A Comparison of Detection Performance for Several Track-before-Defect Algorithms;" EURASIP Journal on Advances in Signal Processing; vol. 2008; Article ID 428036; Oct. 2007; 10 pages.

Giuli, et al.; "Radar Target Scattering Matrix Measurement Through Orthogonal Signals;" IEEE Proceedings—F; vol. 140; No. 4; Aug. 1993; 10 pages.

Haykin; "Cognitive Radar: A Way of the Future;" IEEE Signal Processing Magazine; 23(1):30-40; 11 pages; Jan. 2006.

Haykin; "Radar Vision;" IEEE International Radar Conference; Second International Specialist Seminar on the Design and Application of Parallel Digital Processors; Apr. 15-19, 1991; 4 pages.

Haykin, et al.; "A Coherent Dual-Polarized Radar for Studying the Ocean Environment;" IEEE Transactions on Geoscience and Remove Sensing; vol. 29; No. 1; Jan. 1991; 3 pages.

Husson, et al.; "Discrimination Between Hail and Rain Precipitation Types from Dual Polarization Radar, Raingage and Hailpad Data;" Theoretical and Applied Climatology; vol. 40; Issue 4, pp. 201-207; Dec. 1989; 7 pages.

Islam, et al.; "Artificial Intelligence Techniques for Clutter Identification with Polarimetric Radar Signatures;" Atmospheric Research 109-110 (2012) 95-114; Jun. 2012; 19 pages.

Lamont-Smith; Waves in Random Media—Doppler Spectra of Laboratory Wind Waves at Low Grazing Angle; 10:1; 33-41; Taylor & Francis; Aug. 19, 2006; 10 pages.

McLaughlin, et al.; "High Resolution Polarimetric Radar Scattering Measurements of Low Grazing Angle Sea Clutter;" IEEE Journal of Oceanic Engineering; vol. 20; No. 3; Jul. 1995; 13 pages.

Nathanson, et al.; "Radar Design Principles—Signal Processing and the Environment;" Scitech Publishing; Second Edition; McGraw-Hill; Jan. 1991; 1 of 3; 200 pages.

Nathanson, et al.; "Radar Design Principles—Signal Processing and the Environment;" Scitech Publishing; Second Edition; McGraw-Hill; Jan. 1991; 2 of 3; 200 pages.

Nathanson, et al.; "Radar Design Principles—Signal Processing and the Environment;" Scitech Publishing; Second Edition; McGraw-Hill; Jan. 1991; 3 of 3; 324 pages.

Poelman; "Virtual Polarisation Adaptation; A Method of Increasing the Detection Capability of a Radar System Through Polarisation-Vector Processing;" IEEE Communications, Radar and Signal Processing; vol. 128; Issue 5; Oct. 1981; 10 pages.

Rohling; "Radar CFAR Thresholding in Clutter and Multiple Target Situations;" IEEE Transactions on Aerospace and Electronic Systems; vol. AES-19; No. 4; Jul. 1983; 14 pages.

Rohling; "Some Radar Topics: Waveform Design, Range, CFAR and Target Recognition;" Advances in Sensing with Security Applications; pp. 293-322; Feb. 2006; 30 pages.

Smith, et al.; "Doppler Radar Measurement of Wave Groups and Breaking Waves;" Journal of Geophysical Research; vol. 101; No. C6; pp. 14,269-14,282; Jun. 15, 1996; 14 pages.

Smith, et al.; "Maritime Target and Sea Clutter Measurements with a Coherent Doppler Polarimetric Surveillance Radar;" Proceedings of the IEEE Radar Conference; Apr. 25, 2002; 5 pages.

Tough, et al.; "The Modelling and Exploitation of Spatial Correlation in Spiky Sea Clutter;" EURAD 2005; European Radar Conference; Mar. 27, 2006; 4 pages.

Valenzuela, et al.; "Study of Doppler Spectra of Radar Sea-Echo;" Journal of Geophysical Research; 75(3):551-563; Nov. 3, 1969; 57 pages.

Van Zyl, et al.; "Imaging Radar Polarization Signatures: Theory and Observation;" Radio Science; vol. 22; No. 4; pp. 529-543; Jul.-Aug. 1987; 15 pages.

Wanielik, et al.; "Measured Scattering-Matrix-Data and a Polarimetric CFAR-Detector Which Works on this Data;" Record of the IEEE 1990 International Radar Conference; May 7-10, 1990; 6 pages.

Walker; "Doppler Modelling of Radar Sea Clutter;" IEEE Proceedings of Radar, Sonar and Navigation; vol. 148; No. 2; Apr. 2001; 8 pages.

Ward, et al.; "Maritime Surveillance Radar, Part 1: Radar Scattering from the Ocean Surface;" IEEE Proceedings of Radar and Signal Processing; vol. 137; No. 2; Apr. 1990; 12 pages.

Ward, et al.; "Maritime Surveillance Radar, Part 2: Radar Scattering from the Ocean Surface;" IEEE Proceedings of Radar and Signal Processing; vol. 137; No. 2; Apr. 1990; 10 pages.

Watts; "Radar Sea Clutter: Recent Progress and Future Challenges;" 2008 IET Seminar on Radar Clutter Modelling; Feb. 19, 2008; 7 pages.

Werle; "Sea Backscatter, Spikes and Wave Group Observations at Low Grazing Angles;" Record of the IEEE 1995 International Radar Conference; May 8-11, 1995; 9 pages.

International Preliminary Report on Patentability dated Jun. 6, 2019 for International Application No. PCT/US2017/062954; 8 Pages.

PCT International Search Report of the ISA for PCT App. No. PCT/US2017/062954 dated Feb. 1, 2018; 3 pages.

PCT Written Opinion Search Report of the ISA for PCT App. No. PCT/US2017/062954 dated Feb. 1, 2018; 6 pages.

* cited by examiner

SYSTEM AND TECHNIQUE FOR MITIGATION OF CLUTTER IN RADAR

CROSS REFERENCE TO RELATED APPLICATION

This application claims the benefit of U.S. Provisional Application No. 62/425,216 filed Nov. 22, 2016, titled "POLARIMETRIC CO-LOCATION LAYERING: A PRACTICAL ALGORITHM FOR MITIGATION OF SEA CLUTTER IN RADAR," which is incorporated by reference herein in its entirety.

GOVERNMENT RIGHTS

This invention was made with Government support under Contract No. FA8721-05-C-0002 awarded by the U.S. Air Force. The Government has certain rights in this invention.

BACKGROUND

As is known in the art, in radar, undesirable returns (or echoes) are sometimes referred to as clutter. There are a variety of different types of clutter. Sea clutter, for example, refers to unwanted radar returns generated in response to a radio frequency (RF) signal being redirected from the sea. Sea clutter returns are highly dependent on many variables, including, but not limited to environmental parameters, radar parameters and geometric parameters.

Maritime surveillance radars face the challenge of seeing relatively small objects (i.e. objects which are small as compared to the radar field of view) against backscatter from water (i.e. sea clutter). Sea clutter poses unique challenges for maritime radars at all angles of incidence, but especially for radars directed towards water at a near-horizontal incidence angle (e.g. radars looking out to sea). In such low grazing-angle (LGA) geometries, the typical probability distribution assumptions underlying conventional constant false alarm rate (CFAR) detection do not hold. As a result, the false alarm rate of CFAR detectors may increase so dramatically that trackers may be inundated with spurious detections. False alarms on LGA sea clutter can look object-like and can persist for several seconds. The false alarm problem becomes more prevalent for finer range resolution (i.e. higher bandwidth) waveforms. LGA sea clutter is also a temporally non-stationary and spatially inhomogeneous process, rendering statistical solutions to the CFAR-in-LGA-sea clutter problem difficult to realize.

As is also known, polarization is an underutilized dimension of signal information in radar. This is true for surveillance radar in general and for maritime surveillance radar in particular. Fully polarimetric radars are still largely experimental due, at least in part, to perceptions of their complexity and expense. Nevertheless, mitigation of LGA sea clutter through the use polarimetric information has been suggested. Much of the work on LGA sea clutter, including in the polarimetric regime, often relies upon impractical assumptions regarding the statistical nature of the clutter and/or of the target. Even approaches that make the fewest such assumptions have not been shown to be robust across radar and environmental parameters.

SUMMARY

Described herein are concepts, systems, devices and techniques directed towards mitigation of clutter in radar.

In one embodiment, the concepts, systems, devices and techniques described herein are directed towards mitigation of clutter in radar and operates on data generated by a radar system capable of producing detections using RF signals having two orthogonal polarizations. The systems and techniques include processing sets of radar return pulses (with as few as one pulses per set) in each of a first polarization and an associated, second orthogonal polarization; performing detections on each processed signal to form a detection set; associating pairs of detections across the first and second polarizations; and monitoring displacement of the associated pairs of detections across the first and second polarizations across a sequence of sets of radar return pulses.

With such an arrangement, the systems and techniques described herein utilize a polarimetric characteristic of clutter that distinguishes the clutter returns from returns due to other objects such as man-made objects or stationary objects. In an illustrative embodiment, returns from clutter measured by horizontally polarized on transmit and receive (HH) radar have velocities that are different, on the average, from those measured by vertically polarized on transmit and receive (VV) radar. By comparing the displacement of associated pairs of detections across the first and second polarizations across a sequence of sets of radar return pulses, it is possible to eliminate detections occurring due to clutter. It has been found that the system and technique described herein is robust across waveform bandwidths, pulse repetition frequencies (PRFs) and object types.

In one embodiment, the concepts, systems, devices and techniques described herein are directed towards mitigation of sea clutter in maritime radar. One underlying principle behind the concepts, systems, devices and techniques described herein with respect to mitigation of sea clutter in maritime radar is that while sea clutter exhibits an average Doppler differential across polarizations, man-made objects do not. That is, the sea clutter scattering mechanisms that respond to radio frequency (RF) signals having a horizontal polarization tend to produce different velocities on the average with respect to the radar than do those scattering mechanisms that respond to RF signals having a vertical polarization. For man-made objects, this is untrue. If an object is moving at a Doppler velocity (v) having units of meter per second (m/s), for example, with respect to the radar, then that object will be moving at v m/s with respect to the radar in both horizontally and vertically polarized radar returns, provided that the object has a signature in both returns. The preceding statement is valid for a rigid point target and is also true for extended objects, which comprise many rigid point scatterers.

In one aspect of the concepts, systems, devices and techniques described herein, a system and technique for mitigating sea clutter may be implemented using only HH and VV measurements (where RF signals which are horizontally polarized on both transmit and receive are denoted as "HH" signals and thus produce HH measurements in a radar, while RF signals which are vertically polarized on transmit and receive are denoted as "VV" signals and thus produce VV measurements in a radar). That is, sea clutter returns generally exhibit different mean Doppler signatures in HH and VV, and objects will not. Thus, in an embodiment, a system executes a series of steps to determine detection pairs produced by standard one-dimensional (1-D) constant false alarm rate (CFAR) processes in HH and VV which retain polarimetric co-location on the average over time. The technique deems such detection pairs potential object detections and filters out all others.

With such an arrangement, it has been found that the technique described herein is robust across waveform bandwidths, pulse repetition frequencies (PRFs), object types and sea states, regularly achieving a reduction of two orders of magnitude in 1-D empirical false alarm rate over that of standard CFAR while maintaining continuous detections on objects. Furthermore, the technique described herein is also practical. It can be layered in parallel into a standard radar signal processing chain (i.e. incorporated into a standard radar signal processing chain without disrupting the conventional processing) without introducing undue computational complexity or requiring restructuring of the existing radar signal processing chain. For radar coherent processing intervals (CPIs) comprising more than one pulse and a sufficient number of range bins, the systems and techniques described herein are more efficient than the standard radar processes with which it runs in parallel. Thus, integrating, incorporating or otherwise including or using the clutter mitigation technique described herein in a standard radar processing chain does not slow down such a processing chain because it runs in parallel with it. This is due, at least in part, to the fact that the clutter mitigation technique described herein imposes a very modest computational burden for a standard radar processing chain.

Moreover, by operating with only HH and VV measurements (as opposed to operating with a set of fully polarimetric measurements), a compact polarimetric radar may be used. That is, a radar that can measure both HH and VV co-polarizations, regardless of its ability to accurately recover cross-polarized signatures, can implement the mitigation techniques described herein.

Further still, the systems and techniques described herein may be successful even without polarimetric calibration. Thus, having antennas that are H- and V-polarized would provide measurements that are sufficient for use in the systems and techniques described herein, regardless of any reasonable distortions induced on transmit and receive.

It should, of course, be appreciated that the concepts, systems, devices and techniques described herein may also be used with a fully polarimetric radar. It should also be noted that the technique described herein also works in noncoherent radar. Thus references made herein to a coherent processing interval should not be construed to indicate that coherency is required.

Thus, the systems and techniques describe herein work by leveraging a polarimetric characteristic of sea clutter that distinguishes sea clutter returns from returns due to man-made objects. In an illustrative embodiment, the sea surface features measured by horizontally polarized on transmit and receive (HH) radar have velocities that are different, on the average, from those measured by vertically polarized on transmit and receive (VV) radar.

One result of this characteristic is that CFAR detections on sea clutter in HH radar data move at different speeds across coherent processing intervals (CPIs) relative to CFAR detections on sea clutter in VV. However, the same is not true for detections on man-made objects and/or stationary objects. If a point target has a signature in both the H-H and V-V measurements, then the object will have approximately the same radial velocity with respect to the radar in both polarizations. Extended objects can be viewed as collections of point targets. The systems and techniques describe herein leverage the above differences in speed between sea clutter and man-made objects with respect to signal polarization to filter out false alarms due to sea clutter while retaining detections on objects.

In embodiments, this may be accomplished, for example, by: (1) processing pulses in a CPI in each of HH and VV; (2) performing CFAR detection on each averaged signal; (3) associating pairs of CFAR detections across HH and VV (which may be referred to as "polarimetric co-location"); and (4) monitoring displacement of these pairs across a sequence of CPIs. Pairs that move apart over time are deemed likely to be false alarms due to sea clutter and are filtered out of the detection set that is passed on to the radar tracker. It should again be noted that a CPI can be a single pulse. In addition, it should also be again noted that coherency is not required for the technique described herein to be applied. The techniques described herein could also be implemented using a set of noncoherent pulses, or a single noncoherent pulse. In embodiments where multiple pulses are used, the processing of CPI pulses may include, for example, averaging the pulses.

In accordance with the concepts described herein, it has been recognized that sea clutter returns generated in response to transmitted and received radio frequency (RF) signals having a vertical polarization have characteristics which are different than sea clutter returns generated in response to transmitted and received RF signals having a horizontal polarization. In particular, a mean Doppler frequency is stronger in horizontally polarized (H) RF signals transmitted and received by a radar (denoted at HH) than in vertically polarized (V) RF signals transmitted and received by a radar (denoted as VV). Stated differently, sea clutter appears to be travelling at a different rate of speed in returns from horizontally polarized RF signals than in returns from vertically polarized RF signals and differently from returns from other objects (e.g. man-made objects) and some stationary non man-made objects.

In general it has been recognized that with respect to man-made objects (e.g. buoys) HH and VV signals capture different scattering mechanisms having similar Doppler spectra while with respect to sea clutter, HH and VV signals capture different scattering mechanisms having different Doppler spectra and that this difference can be used to mitigate sea clutter. It has also been found that this characteristic (e.g. different Doppler response from sea clutter than man-made objects) holds across multiple bandwidths, look directions, and sea states and thus the technique described herein for mitigating sea clutter also holds across multiple bandwidths, look directions, and sea states. It has, in accordance with the concepts described herein, also been discovered that this characteristic is more pronounced at lower grazing angles.

With this particular arrangement, a system and technique that leverages polarimetric radar and a characteristic of sea clutter to mitigate the impacts of sea clutter is provided. The system and technique leverage the observation that the sea's scattering mechanisms in HH and VV move at different speeds on the average.

In one embodiment, the described system and technique is found to be robust across different bandwidths, pulse repetition frequencies (PRFs), sea states and object types and can be incorporated into a standard radar signal processing chain without slowing down radar performance. Because the sea clutter mitigation systems and techniques described herein requires only linear co-polarized measurements, the systems and techniques can run in any radar capable of measuring HH and VV.

Furthermore, due to its simplicity, the sea clutter mitigation systems and techniques described herein are robust and practical and may be easily integrated into existing radar systems (e.g. it is a "plug-and-play" technique which can be directly incorporated into a standard radar signal processing chain). The systems and techniques described herein work in any radar capable of measuring HH and VV. Furthermore, the systems and techniques described herein routinely reduce CFAR false alarm rate (and in some instances a reduction of about two orders of magnitude may be achieved). Furthermore, due to its simplicity, the PCL system and technique described herein is computationally efficient.

It should of course be recognized that a trade-off may be made propagation of detections in accordance with the systems and techniques described herein (sometimes referred to as "PCL detections") and propagation of sea clutter false alarms. In embodiments, the system and techniques described herein to mitigate sea clutter retain detections on objects of interest while reducing the number of false alarms in a conventional single polarization radar by as many as two orders of magnitude.

BRIEF DESCRIPTION OF THE DRAWINGS

The foregoing features may be more fully understood from the following description of the drawings in which.

DETAILED DESCRIPTION

Before describing concepts and techniques directed toward systems and techniques for leveraging polarimetric information to mitigate the impacts of clutter (e.g. sea clutter) on radar detections (e.g. CFAR detection) and related devices and systems, some introductory concepts and terminology are explained.

In accordance with the notation used herein, radio frequency (RF) signals which are horizontally polarized on both transmit and receive, are denoted as "H-H" or "HH" signals while RF signals which are vertically polarized on transmit and receive are denoted as "V-V" or "VV" signals. Thus, so-called "H-H radars" produce H-H radar returns (or "HH radar data" or more simply "HH returns"). Similarly, so-called "V-V radars" produce V-V radar returns (or "VV radar data" or more simply "VV returns").

Further, it is recognized that the described concepts, systems and techniques find particular use in maritime radar systems operating at a low grazing-angle (LGA). Thus, in one embodiment described herein, polarimetric radar and a characteristic of sea clutter are used to mitigate the impacts of sea clutter in radar systems. One illustrative embodiment of the technique to mitigate the impacts of sea clutter in radar systems is sometimes referred to herein as Polarimetric Co-location Layering (PCL). Thus, reference is sometimes made herein to an illustrative PCL technique and/or to an illustrative PCL system that is specifically directed toward mitigation of sea clutter in a maritime radar.

Accordingly, while some figures herein are used to help illustrate a particular technique that leverages a characteristic of the Doppler spectra of sea clutter and man-made objects to classify detections, the broad concepts, systems and techniques described herein are not so limited.

For example, it should be appreciated that while in the description herein below reference is made to systems operating with linear HH and VV polarized signals, more generally, the concepts, systems and techniques described herein may be used with any orthogonally polarized signals (e.g. in applications not specifically directed toward mitigation of sea clutter). Thus, while the concepts described herein find application with sea clutter, the general concepts, systems and techniques may also find application with mitigation of other types of clutter or with mitigation of undesired signals in general, in which case it may be desirable or even necessary to use orthogonally polarized signals other than HH, VV (e.g. right hand and left hand circularly polarized signals).

Furthermore, it should be appreciated that reference is sometimes made herein to illustrative embodiments in which averaging of pulses takes place. After reading the disclosure provided herein, those of ordinary skill in the art will readily recognize that while some embodiments may utilize coherent averaging of pulses, it is not required. In some embodiments one could simply compute the sum of the magnitudes rather than the magnitude of the sum and still be successful or leverage other processing as described herein.

Also, with respect to the techniques of FIGS. 1-6, in preferred embodiments, the "detections" referred to herein below may be produced using a standard constant false alarm (CFAR) detection approach as either detections on objects or on clutter. It should, however, be appreciated that the general concepts sought to be protected herein apply to any form of detections (e.g. detections made using orthogonally polarized RF (or even more generally EM) signals).

Figure 1:
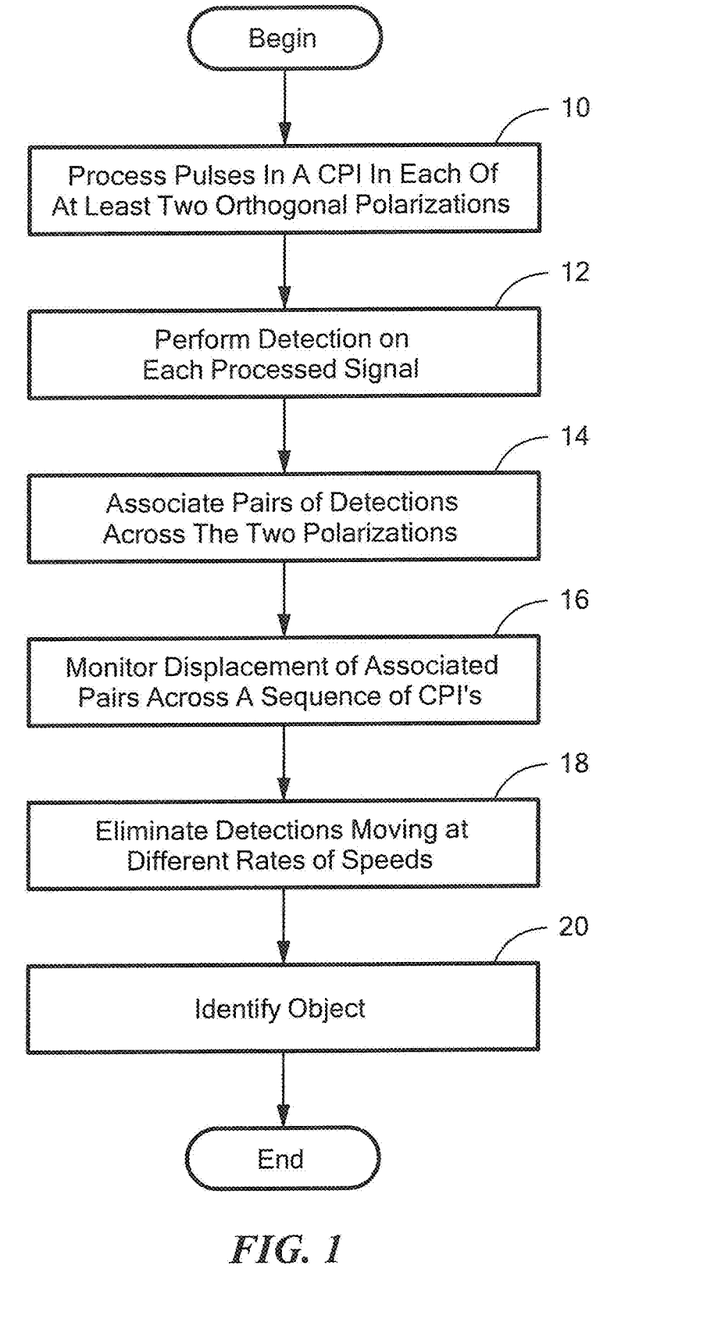
FIG. 1 is a flow diagram of a technique for mitigating clutter in a radar.

Turning now to FIG. 1, a flow diagram of a process for leveraging polarimetric radar and at least one characteristic of an object to mitigate the impacts of clutter begin as shown in processing block 10 in which after collection of radar data using at least two orthogonal signals, one or more pulses in a CPI for data from the at least two orthogonal signals are processed. In some embodiments, such processing includes averaging the data. For example, in a radar system transmitting and receiving linear VV and HH signals, after collection of HH and VV radar data, the pulses in a CPI for each of the horizontal and vertical data is average (i.e. the HH data is averaged and the VV data is averaged). In an embodiment directed toward mitigation of sea clutter, such polarimetric radar data and a characteristic of sea clutter may be used to mitigate the impacts of sea clutter such as LGA sea clutter. It should be noted that the signals may not be averaged over time; that is, the clutter mitigation technique described herein may work on processing intervals that are a single pulse in length.

Processing then proceeds to processing block 12 in which detections are performed on each processed signal. If the processing of processing block 10 includes averaging, then detections are performed on each averaged signal. Thus, a set of detections (or detection set) is formed in both the first and second orthogonal polarizations. The detections correspond to potential targets or objects of interest.

The detections are then associated across the orthogonal polarizations (e.g. across HH and VV) to form associated detection pairs as shown in processing block 14. This requires a priori knowledge of known differences in responses to orthogonally polarized data from objects giving rise to clutter returns. For example, the knowledge that CFAR detections on sea clutter in HH radar data move at different speeds across coherent processing intervals (CPIs) relative to CFAR detections on sea clutter in VV.

Once the associated detection pairs are formed, then as shown in processing block 16, the displacement of associated detection pairs is monitored across a sequence of CPIs. Associated detection pairs that move relative to each other over time (e.g. move apart over time) are deemed likely to be false alarms due to clutter (e.g. sea clutter) and are filtered out of the detection set that is passed on to a radar tracker, for example.

Thus, as shown in processing block 18, detections moving at different rates of speed within each associated detection pair are eliminated as potential targets. This again requires a priori knowledge of known differences in responses to orthogonally polarized data from objects giving rise to clutter returns. For example, with the knowledge that CFAR detections on sea clutter in HH radar data move at different speeds across coherent processing intervals (CPIs) relative to CFAR detections on sea clutter in VV and that the same is not true for detections on objects of interest, then it is possible to eliminate detections moving at different rates of speed.

Processing then proceeds to processing block 20 where one or more targets is identified.

Figure 2:
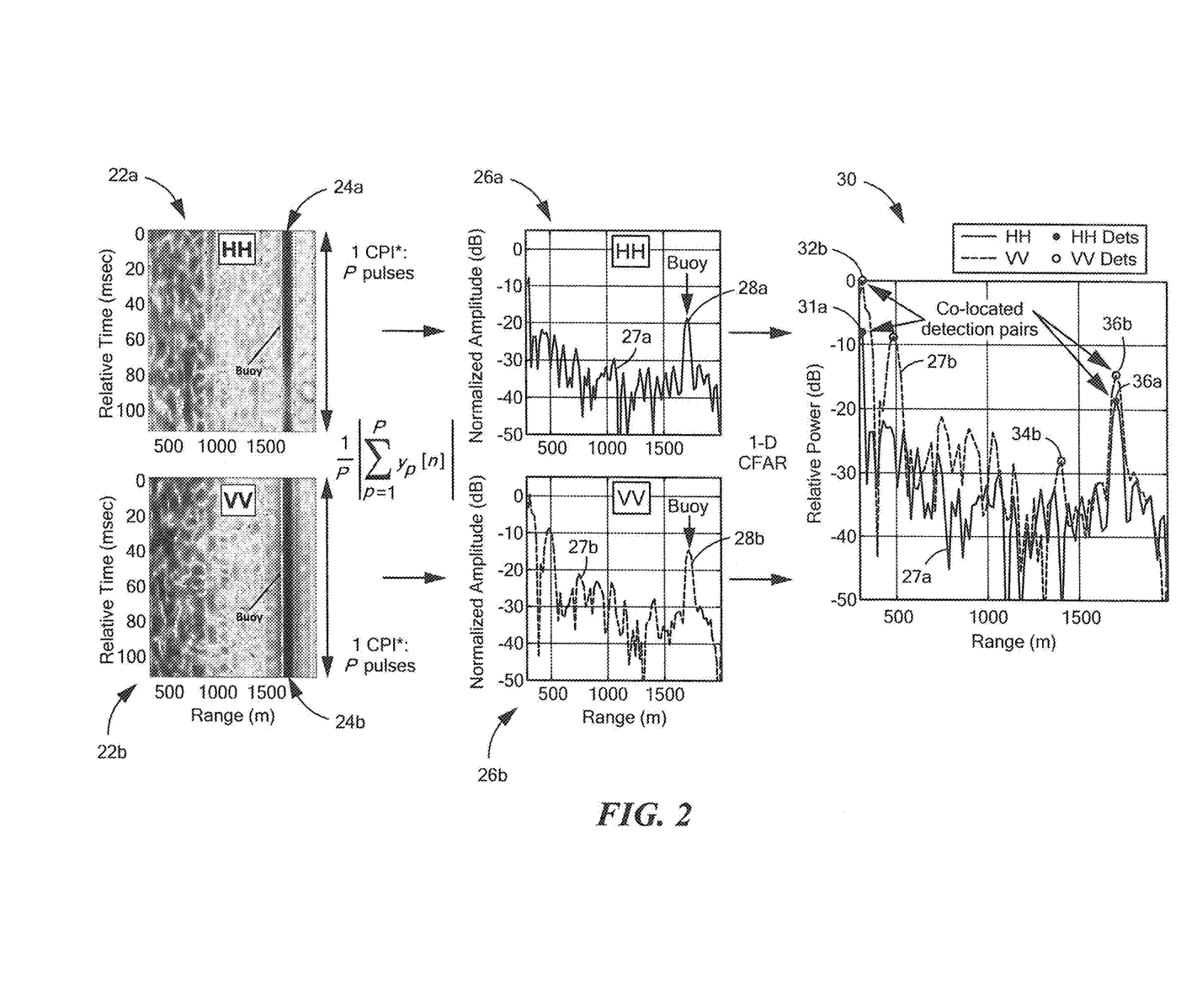
FIG. 2 is a diagrammatic sequence which illustrates a technique for mitigating sea clutter.

Referring now to FIG. 2, an illustrative embodiment of the above technique as applied to mitigation of sea clutter is shown. In this illustrative embodiment, a 2 microsecond (μsec) 4 mega-Hertz (MHz) waveform is used. The radar data used in the example of FIG. 2 contains data collected on a buoy, which has a strong return relative to the background and is stationary in range at a distance of approximately 1.7 km form the radar. The buoy exhibits a Doppler signature over time that takes on values in the approximate range of [−1, 1] meters per second (m/sec) as the buoy bobs atop an undulating ocean surface. Few false alarms are produced for a waveform of this bandwidth and the buoy is not obscured by a clutter background in a range-Doppler (RD) image because of its low Doppler and range from the radar. Hence, it is not a challenging case, but it is an instructive one.

First consider range-time intensities (RTIs) from one CPI of this data across HH and VV polarizations. The CPI comprises 100 pulses, slow-time decimated by factor m=7, yielding a pulse repetition frequency (PRF) of approximately 893 Hz. The RTIs for HH and VV are illustrated in FIG. 2 as elements 22a, 22b, respectively. The signal return from the buoy 24a, 24b is evident throughout the RTIs and is identified with reference numerals 24a, 24b, respectively on the images 22, 22b. All other returns are due to sea clutter. As is known, the SNR of a given object is dependent upon the number of pulses integrated (or, equivalently, averaged) in the radar processing chain. Thus, the basic coherent average of each of these RTIs to yield 1-D range proles of the radar scene may be computed as:

$$s_{hh}[n] = \frac{1}{P}\left|\sum_{p=1}^{P} y_{hh}^{[p]}[n]\right| \quad \text{Equ. (1)}$$

$$s_{vv}[n] = \frac{1}{P}\left|\sum_{p=1}^{P} y_{vv}^{[p]}[n]\right|$$

in which:

p corresponds to the RTI pulse index;
n corresponds to the range index; and
subscripts hh and vv indicate the channel whose RTI is being coherently averaged.

It should again, be appreciated that while coherent averaging is being used in this case, it is not required. As noted above, a system could instead compute the sum of the magnitudes rather than the magnitude of the sum and still be successful or leverage other processing.

The signals $s_{hh}$ and $s_{vv}$ are shown in plots 26a, 26b respectively and are identified with reference numerals 27a, 27b. For the purposes of this example, P is fixed at P=100 for all CPIs, regardless of waveform. This is an arbitrary selection and the rationale behind this choice is that it is well known that the transient characteristics of sea clutter decorrelate on timescales less than 10 msec at X-band (Chan, 1987; Antipov, 1998). Consequently, choosing P=100 which comprises about 16 milliseconds at the highest PRF of the so-called Four Eyes radar ensures averaging over timescales at least as long as the usual decorrelation time of transient sea clutter characteristics.

The effect of coherently averaging these P pulses is that one has averaged over the Doppler response of the scatterers in each range bin. That is, the average Doppler frequency of each channel in each bin has been captured.

The operation typically performed by a coherent radar's standard radar signal processing chain on a CPI of pulses is Doppler processing. Doppler processing amounts to computing the discrete Fourier transform of samples across slow-time in each range bin to determine the strength of each of the complex exponentials measured across the CPI time at each of the velocities measured by the radar's slow-time sampling frequency.

The location of a scatterer at range $R_0$ from the radar as a function of slow-time in either channel (i.e. either hh or vv) can be written as:

$$y[p] = Ae^{-j\frac{4\pi}{\lambda}(R_0 - v(pT + \frac{2R_p}{c}))} \quad \text{Equ. (2)}$$

$$= Ae^{-j\frac{4\pi}{\lambda}(R_0 - \frac{2vR_p}{c})}e^{j2\pi(\frac{2v}{\lambda})pT}$$

in which:
A captures signal amplitude and attenuation;
c=the speed of light;
p=the pulse number in the CPI pulse sequence;
$R_p$=the scatterer's range to the radar on the pth pulse; and
T [sec] is the pulse length.

It should be noted that in the above, the "stop-and-hop" approximation, which assumes target motion stops while the radar pulse is in transit, has been used.

The first exponential term captures a phase shift relative to all terms of the slow-time sample sequence. The second exponential term captures the Doppler frequency of the scatterer.

The radar's slow-time sampling frequency corresponds to the PRF comprised by the second exponential term in Equation (2).

By coherently averaging across slow-time instead of Doppler processing, the signal SNR is improved by a factor of P, but rather than doing so by integrating the strength of the individual Doppler velocities of all scatterers in each range bin, the average Doppler velocity in each range bin in each channel is captured.

The coherent averages of signals $s_{hh}$ and $s_{vv}$ are thus understood to capture the strength of the average Doppler response in each range bin. Note again, however, that the average Doppler response in each range bin is captured in noncoherent averages by monitoring the displacement of signal returns relative to the radar across time; hence, noncoherent averaging still works as a means of capturing the average Doppler response.

Passing signals $s_{hh}$ and $s_{vv}$ 27a, 27b through a 1-D CFAR detection process, yields two sets of detections 32a, 32b and 36a, 36b as illustrated in plot 30. Detections 32a, 32b and 36a, 36b are functions of range-only in each channel and may be produced, for example, by CA-CFAR processing applied to the signals 27a, 27b.

The probability of false alarm for the CA-CFAR results was set to Pfa=$10^{-6}$. It should be noted that in this illustrative example the 4 MHz waveform is being used as an instructive case. Thus, conclusions should not be drawn regarding the number of detections that 1-D CFAR operations will yield in the cases of finer resolution waveforms.

As illustrated in plot 30, two pairs of detections 32a, 32b, and 36a, 36b are co-located in range across HH and VV polarization curves 27a, 27b. One of these pairs comprises detections on sea clutter while the other comprises detections on the buoy.

The manner in which those detections corresponding to sea clutter and those detections corresponding to the buoy, may be most easily visualized (and will be described below) with reference to FIGS. 3A-3I.

Briefly, however, it is recognized that the locations of detections on the moving sea surface will change from CPI to CPI, or in the noncoherent case, from noncoherent CPI (NCPI) to NCPI. However, because HH and VV capture different scattering mechanisms of the sea surface with different mean Doppler frequencies and the mean Doppler of HH is more significant than the mean Doppler of VV, it is expected that even those sea clutter detections that persist from CPI to CPI will move across range at different rates with respect to one another. In other words, sea clutter detections that are co-located on one CPI will not remain co-located across a series of CPIs.

If the radar is imagined as an "observer" floating in the sea at the stationary range equal to the waveform's minimum range, then such detections in HH will wash over "the observer" or move away from the observer, depending on look direction faster than will the corresponding detections in VV. Thus, one can set a minimum number of CPIs across which a pair of detections must retain their co-location in range in order to be declared detections on objects rather than detections on the sea.

Recognizing also that the strength of an extended object's signature will vary somewhat in range as a function of polarization for higher bandwidth measurements, one can opt to relax the requirement that detections must be precisely co-located in range. This results in a definition of polarimetric co-location (PCL): a pair of detections on the coherently averaged signals $s_{hh}$ and $s_{vv}$ are considered polarimetrically co-located if they remain approximately co-located in range across a certain number of CPIs. "Approximate co-location" in range is captured by an input parameter $\delta_n$, which is the maximum permitted offset in range that will still allow a detection in HH to be considered co-located with an associated detection in VV. The number of CPIs across which a given detection pair must remain approximately co-located in range is captured by another algorithm input parameter, the PCL CPI criterion, denoted $n_{CPI}$.

Figure 3A:
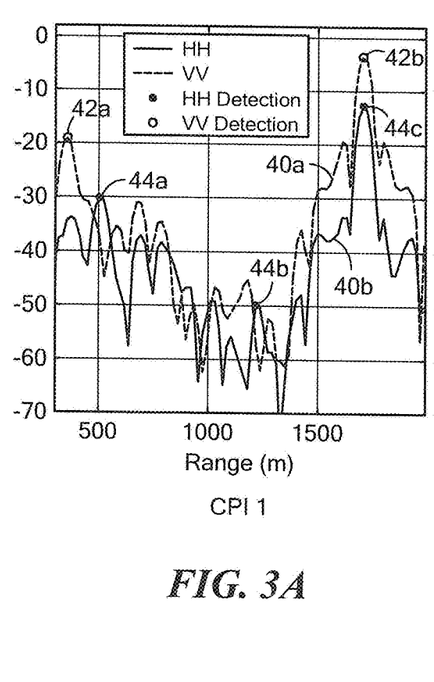
FIGS. 3A-3R are a sequence of views which illustrate results of a technique for mitigating sea clutter which may be the same as, or similar to, that described in FIG. 2.
Figure 3B:
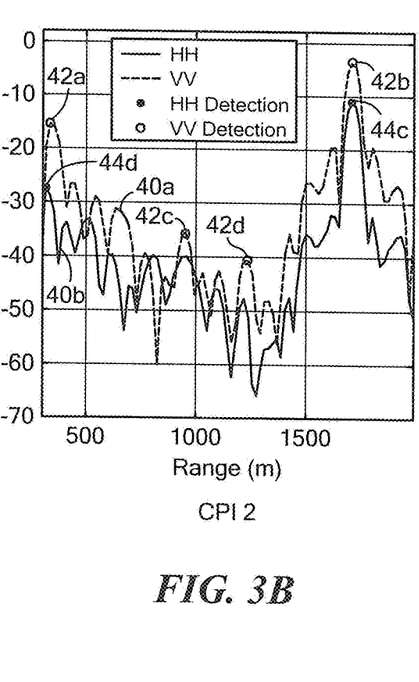
Figure 3C:
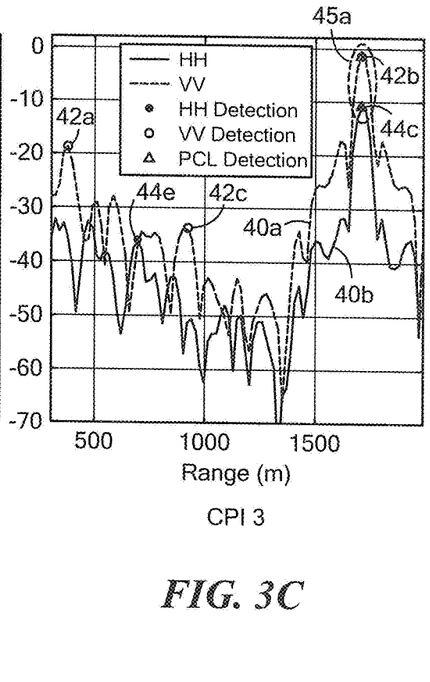
Figure 3D:
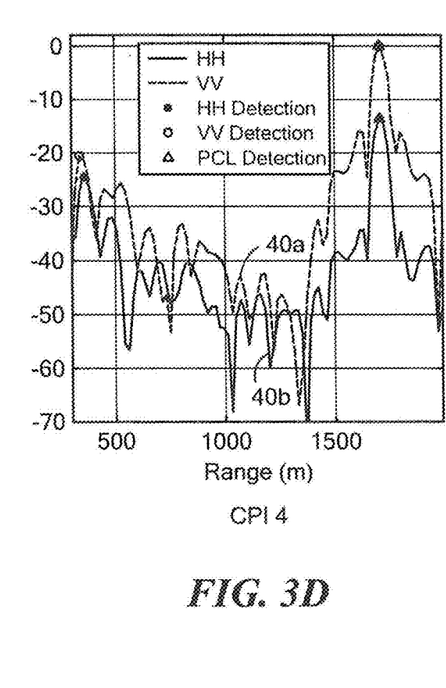
Figure 3E:
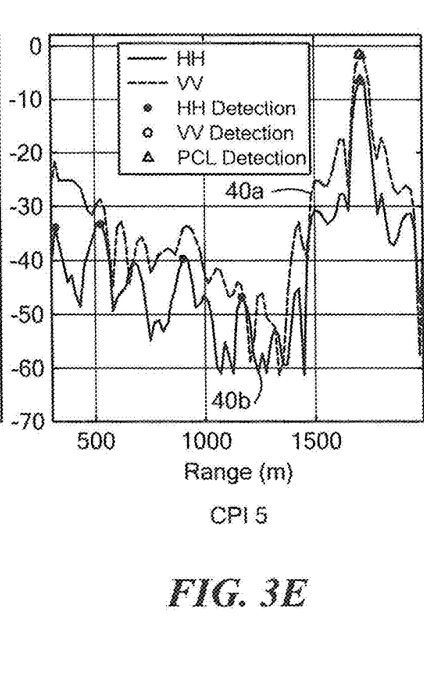
Figure 3F:
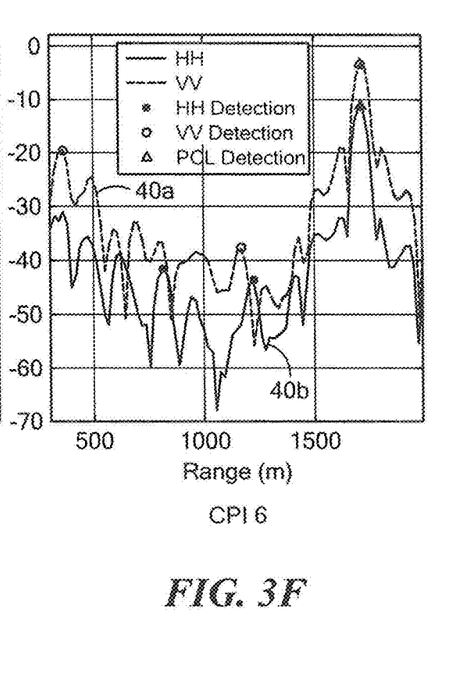
Figure 3G:
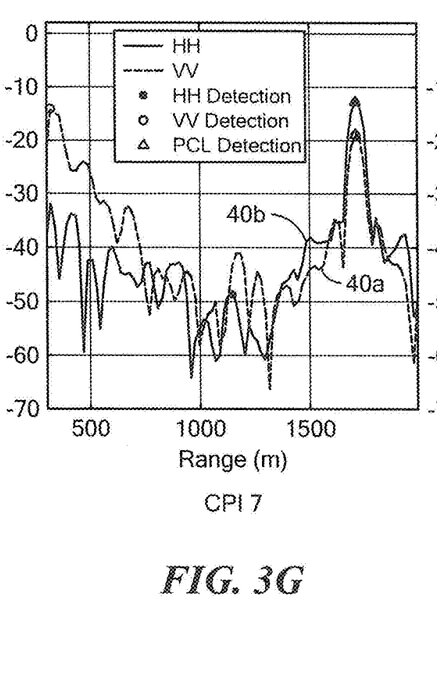
Figure 3H:
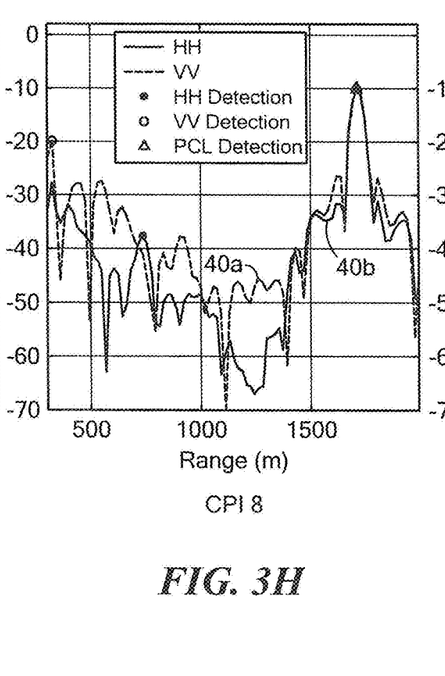
Figure 3I:
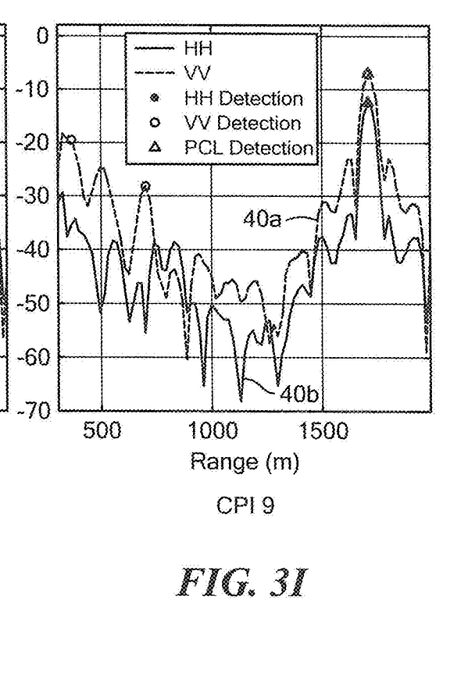
Figure 3J:
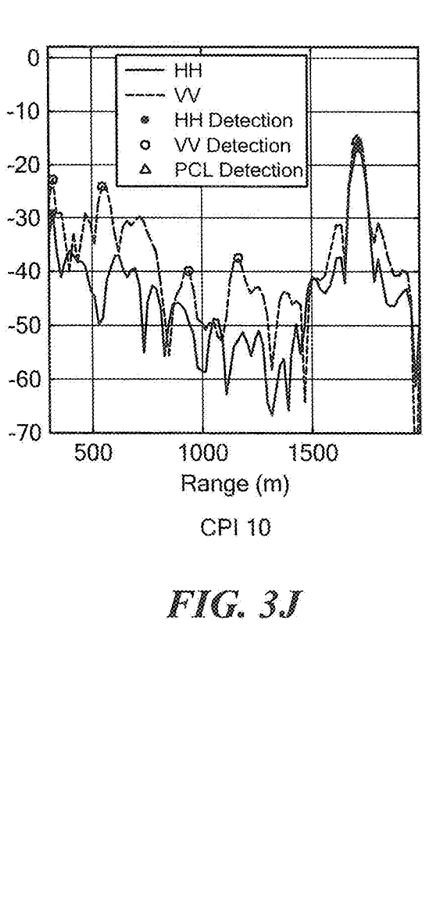
Figure 3K:
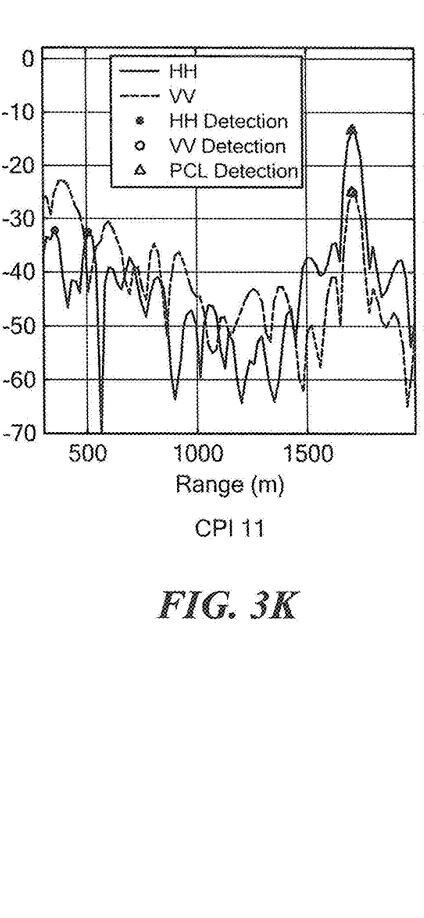
Figure 3L:
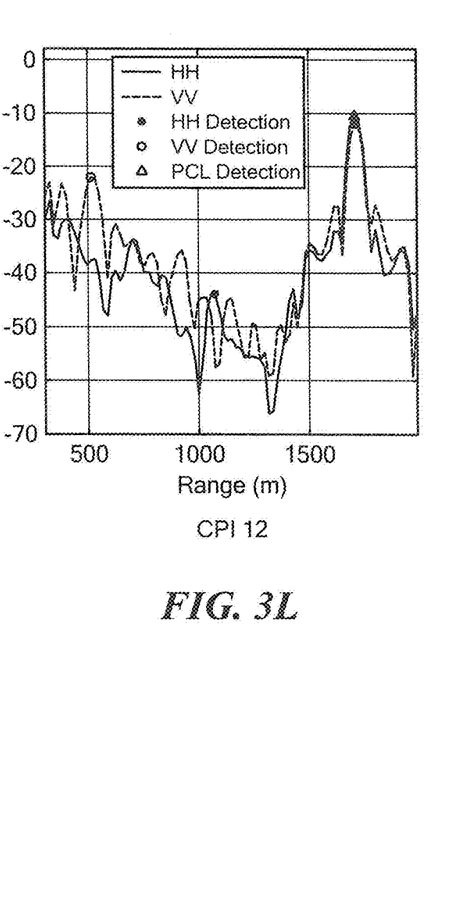
Figure 3M:
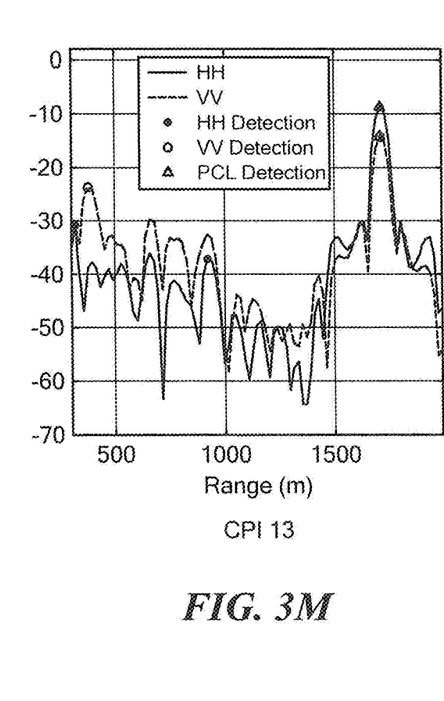
Figure 3N:
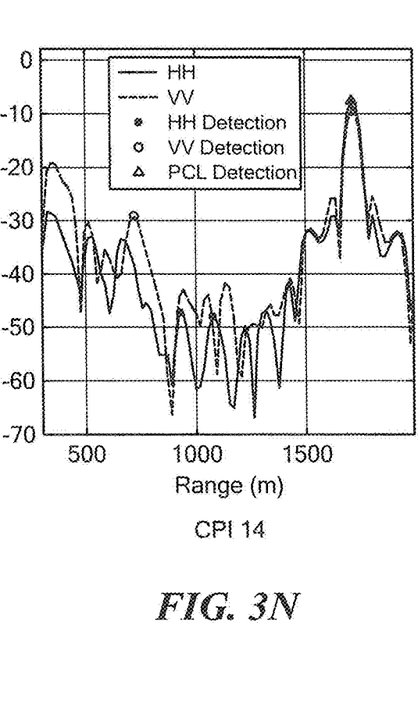
Figure 3O:
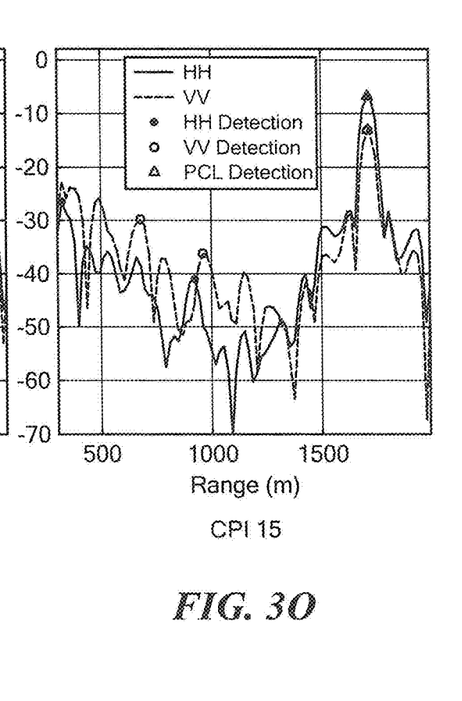
Figure 3P:
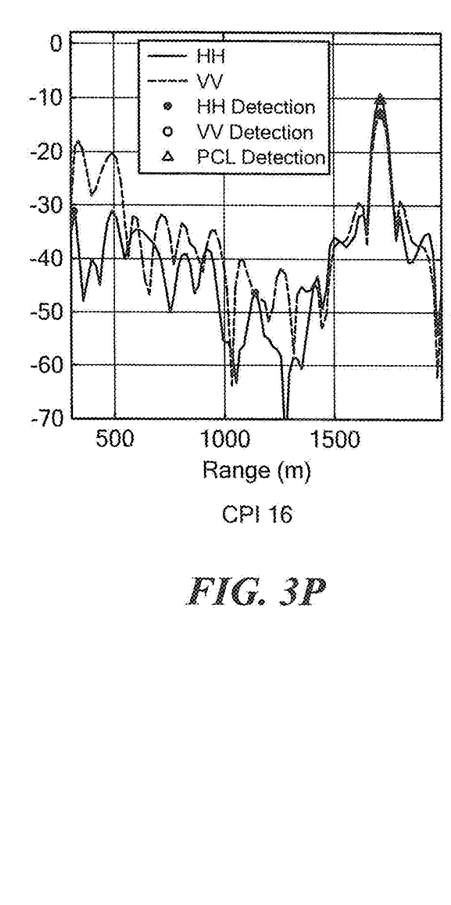
Figure 3Q:
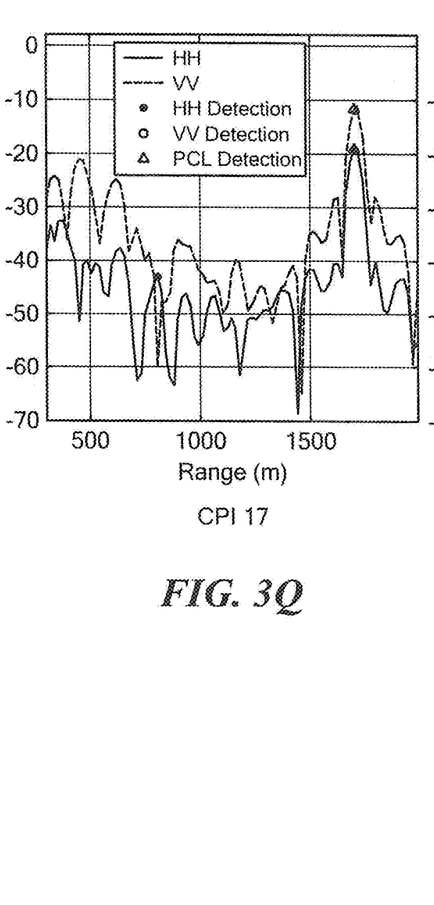
Figure 3R:
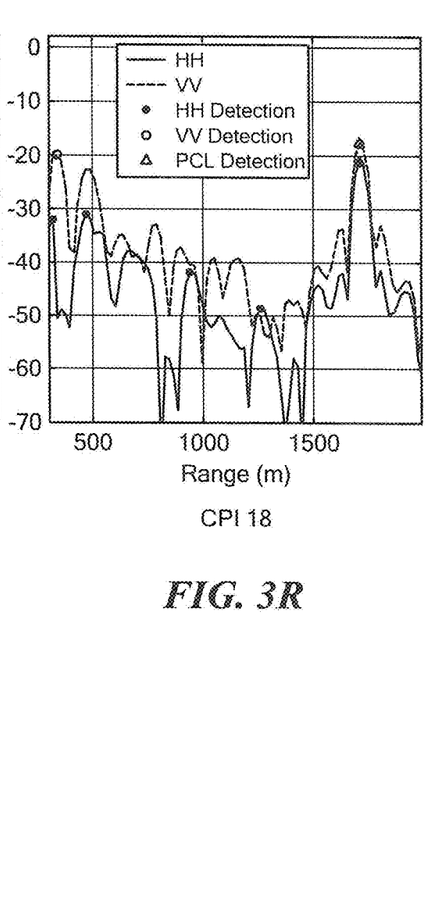

Referring now to FIGS. 3A-3R, one way to show the operation of PCL is with a sequence of plots (or frames) 3A-3R of range vs. normalized amplitude (dB) across a contiguous sequence of CPIs (indicated by the CPI sequence number appearing in the caption for each plot). For this sequence, no slow-time decimation was used in formation of a 100-pulse CPIs. The PRF of the data underlying these images is thus 6250 Hz. The ordinate units are relative power in dB, normalized to the peak response over the entire sequence of CPIs. To generate this sequence, PCL parameters were $n_{CPI}$=3 and $\delta_n$=0.

As the sequence shows, for the 4 MHz waveform, the resolution is low enough such that it suffices to allow no range offset between detection pairs. Moreover, so few detections are generated on the 4 MHz waveform data that three CPIs sufficiently allows sea clutter detection pairs to separate over time due to sea clutter's mean Doppler differential.

On this image sequence, VV and HH signals are indicated with reference numerals 40a, 40b, respectively, and VV and HH detections are indicated with reference numerals 42, 44, respectively. Detection pairs that have remained co-located in range for as long as $n_{CPI}$ CPIs are indicated as PCL detections.

From the sequence, it is seen that on CPI 3 (FIG. 3C), an associated detection pair 45a (formed from detections 42b, 44c) corresponding to the buoy has been declared a PCL detection. It retains this status throughout the remainder of the sequence.

It should be note that a co-located detection pair on sea clutter appears in CPI 10 (FIG. 3J), but because this detection pair does not remain co-located over three CPIs (or even over two, in this case), it never reaches PCL detection status.

Moreover, approximately co-located pairs appear in CPIs 2, 4, 6, 15, and 18 (FIGS. 3B, 3D, 3F, 3O and 3R). Because $\delta_n$=0, these pairs are never considered for PCL detection candidacy across CPIs. It should, of course, be appreciated the described example corresponds to the case of low bandwidth waveforms, high-SNR stationary objects, and a high PRF. Other parameter selections will result in a different number of detections.

Figure 4:
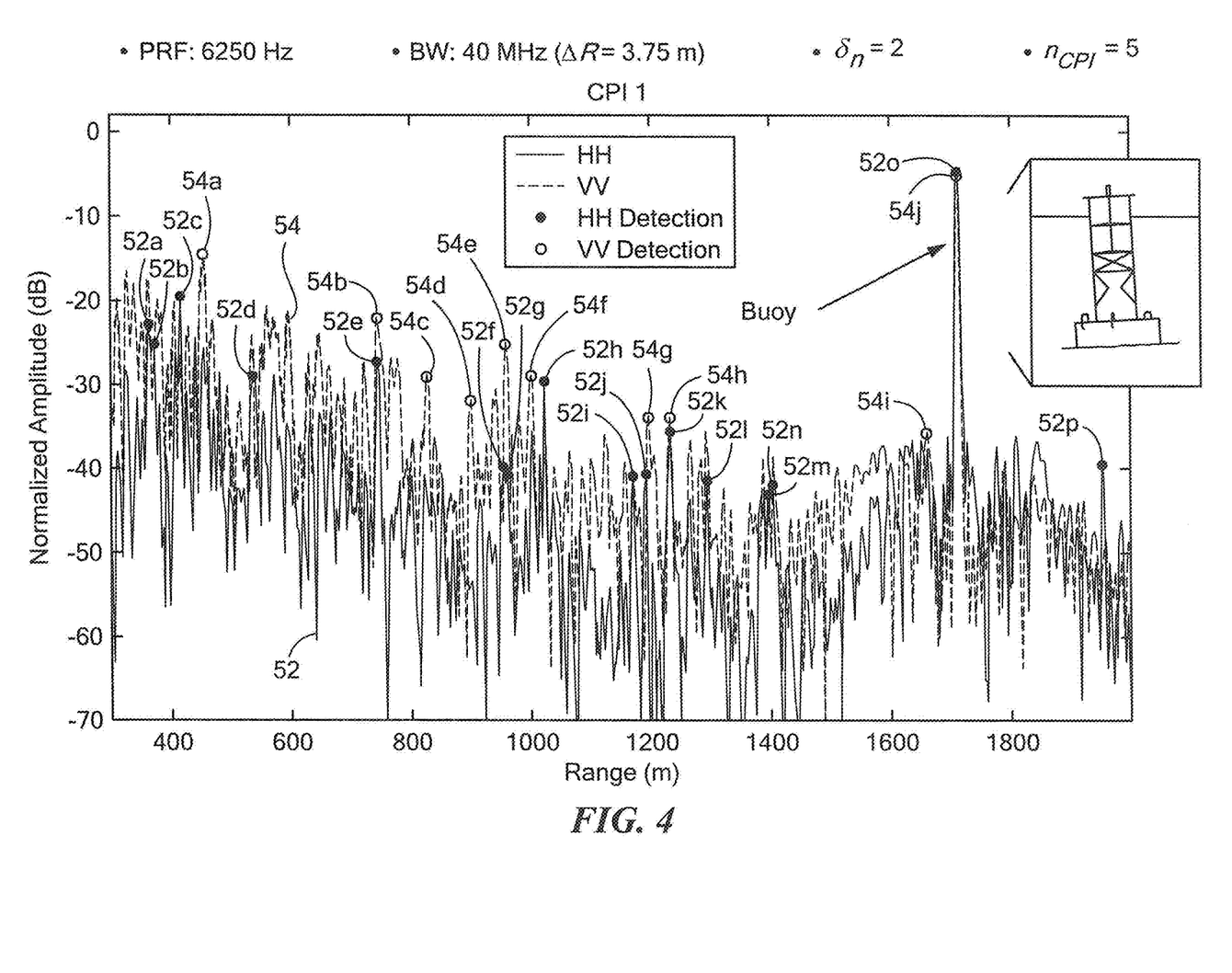
FIG. 4 is a plot of range vs. normalized amplitude of radar return signals.
Figure 5:
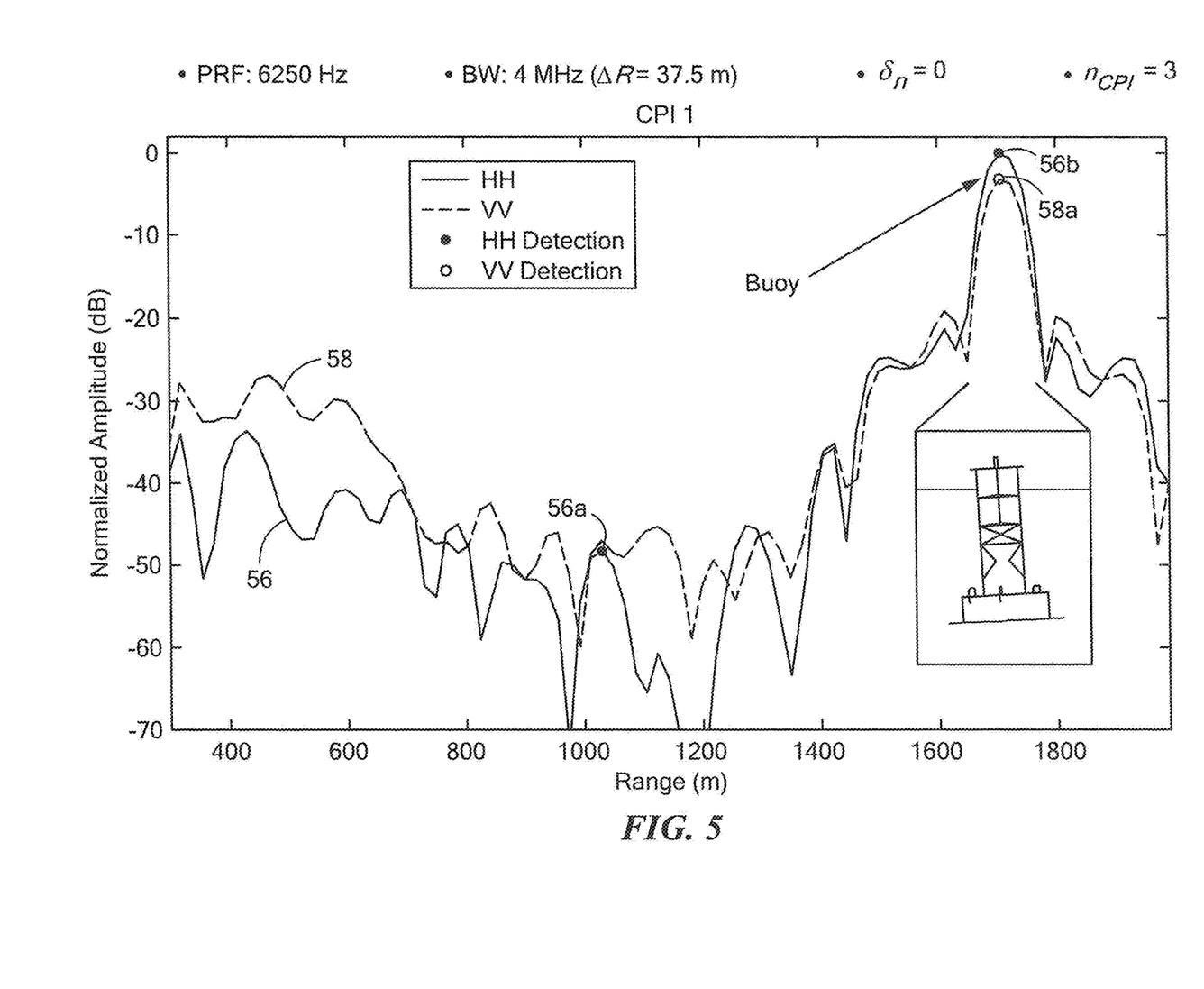
FIG. 5 is a pot of range vs. normalized amplitude of radar return signals after application of a sea clutter mitigation technique in accordance with the concepts described herein.

For example, and with reference to FIGS. 4 and 5 using the following PCL parameters:
PRF=6250 Hz;
BW=40 MHz (ΔR=3.75 m);
$\delta_n$=2; and
$n_{CPI}$=3
detections 52a-52p (sixteen (16) HH detections) and 54a-54j (ten (10) VV detections) occur in FIG. 4 with detection pair 52o, 52j corresponding to the buoy.

In FIG. 5, however, using the following PCL parameters:
PRF=6250 Hz;
BW=4 MHz (ΔR=37.5 m);
δn=0; and
$n_{CPI}$=3
only detections 56a-56b (two (2) HH detections) and 58a (one (1) VV detection) occur in FIG. 5 with detection pair 56b, 58a corresponding to the buoy.

Figure 6:
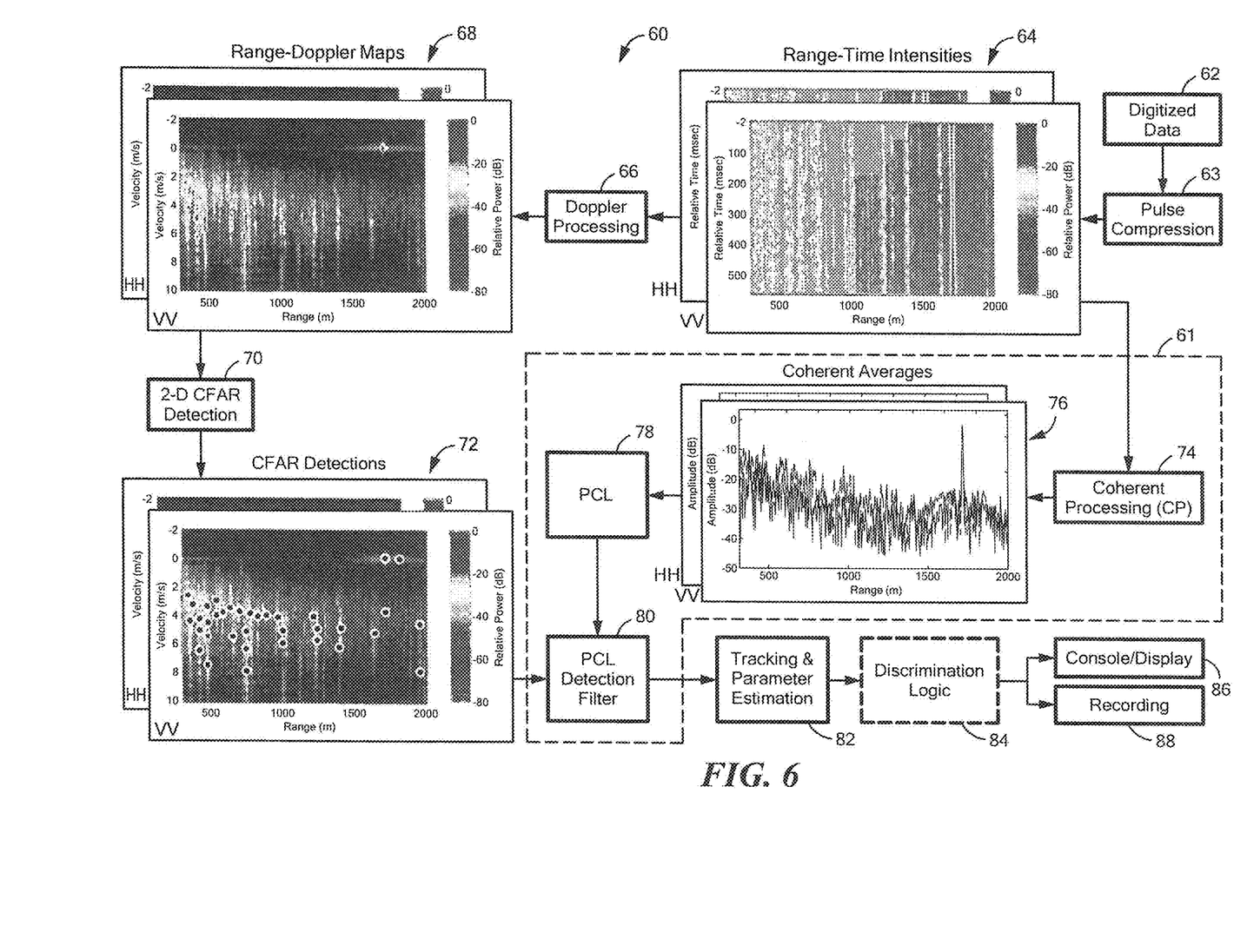
FIG. 6 is a block diagram of a radar system which incorporates a clutter mitigation system and technique which may be the same as or similar to any of the techniques described above in conjunction with FIGS. 1-5.

Referring now to FIG. 6, a radar system 60 includes a conventional radar signal processing chain and an integrated a clutter mitigation system 61. As described in conjunction with FIG. 6, clutter mitigation system 61 is provided as a PCL clutter mitigation system 61 appropriate for mitigation of sea clutter in a radar. It should, of course, be appreciated that other clutter mitigation systems and techniques formed using the broad concepts described herein may be also be integrated into a standard (i.e. a conventional) radar signal processing chain. Such integration is feasible since the clutter mitigation concepts and techniques described herein require neither excessive computational complexity (e.g. no unusual computational processes were required for the PCL technique) nor restructuring of the radar processing chain.

Radar 60 includes an illustrative conventional radar signal processing chain comprising means for receiving radar data (e.g. digitized radar data) 62 and a pulse compression circuit 62 which receives and processes the radar data using any technique known to those of ordinary skill in the art. A processor produces range-time intensities (RTIs) 64 in both HH and VV using the pulse compressed data.

A Doppler processor 66 then performs Doppler processing (again, using any technique known to those of ordinary skill in the art) to produce range-Doppler data (RD "maps") 68 in both HH and VV polarizations. A detector 70 (e.g. a conventional CFAR detector) can then be used to identify detections 72 in both HH and VV.

PCL circuits and processors can be integrated into the above described radar signal processing chain as a parallel process. As discussed above, only coherent integration on already pulse-compressed data followed by 1-D CFAR detection operations in HH and VV channels are required to execute the PCL clutter mitigation technique.

To integrate PCL system 61 and the associated technique, the RTIs are provided to a coherent processing 74 which produces coherent average values 76 in both HH and VV polarizations. The CP data is then provided to a PCL processor 78 which processes the data provided there to form associated detection pairs as described above.

A PCL detection filter 80 is coupled to receive both CFAR detection data as well as PCL data. PCL detection filter then filters the detections to eliminate detections moving at different rates of speed within each associated detection pair.

It should be recognized that in the case of a noncoherent radar, the Doppler processing stage is simply omitted, and PCL is incorporated as a serial rather than a parallel process in the detection chain.

The so-filtered detection data is then provided to a tracking and parameter estimator 82 of the radar as is generally known and then subsequently to optional discrimination logic circuit 84 and to an output system which may include, for example, a console/display 86 and/or a system for recording data 88.

It should be noted that a clutter mitigation system and technique (e.g. a PCL sea clutter mitigation technique) is implemented as a parallel process that executes while Doppler processing 66 and CFAR detection (e.g. 2-D CFAR detection) 70 are performing computations. In this illustrative embodiment, it is only necessary to introduce a single processing element serially in the existing radar signal processing chain. In particular, in this example, only detection filter 80 (in this case corresponding to a PCL detection filter 80) which performs clutter mitigation filtering of CFAR detections is included serially in the radar signal processing chain.

It should be appreciated that the output of PCL processor 78 in this structure and for each CPI is a set of range bins containing PCL detections. PCL detection filtering simply filters out 2-D CFAR detections (e.g. as produced by a standard radar signal processing chain) whose ranges are not included in PCL range bin set.

In the case of a noncoherent radar, PCL detection filtering filters out the 1-D CFAR detections in the RTIs whose ranges are not included in the PCL range bin set.

This may be understood by considering a 2-D CFAR that produces detections in all positions indicated with a 1 in the notional binary matrix:

$$D_{cfar} = \begin{bmatrix} 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 1 & 0 & 1 & 1 & 0 & 1 & 0 & 0 & 1 \\ 0 & 0 & 1 & 0 & 1 & 0 & 0 & 0 & 1 & 0 \\ 0 & 0 & 0 & 0 & 0 & 0 & 1 & 0 & 0 \\ 1 & 1 & 1 & 0 & 0 & 1 & 0 & 1 & 0 & 0 \end{bmatrix}$$

where the row corresponds to the Doppler bin and the column corresponds to the range bin.

A value of one (1) in the matrix is analogous to 2-D CFAR producing a black circle indicating a detection on the CFAR detection RD images 72 in FIG. 6, though the size of the matrix here is significantly reduced to illustrate the concept of PCL filtering. Now consider that PCL, running in parallel, has determined that only detections in range bins 5 and 9 are on objects, while the rest are on sea clutter. Following PCL filtering, the above binary matrix will become:

$$D_{pcl} = \begin{bmatrix} 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 1 & 0 & 0 & 0 & 0 & 0 \\ 0 & 0 & 0 & 0 & 1 & 0 & 0 & 0 & 1 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix}$$

It should, of course, be appreciated that in practical embodiments, there are likely to exist hundreds (or even thousands of false alarms, depending upon radar parameters as discussed above in conjunction with FIGS. 4 and 5) resulting from the 2-D CA-CFAR operations run on each channel's data. Application of the PCL clutter mitigation technique may result in a majority of false alarms being eliminated by a PCL filter, while the detections on the object of interest are preserved. In the case of both 1-D and 2-D detection operations, PCL routinely achieves two orders of magnitude decrease in false alarm rate compared to standard 2-D CFAR on a single polarimetric channel.

To integrate PCL for mitigation of sea clutter in parallel with conventional radar processing, it has been found that in an embodiment using linear HH and VV signals additional computation time can be avoided if HH and a VV detections are: (1) within $\delta_n$ range bins of each other and (2) over $n_{CPI}$ contiguous CPIs.

The sea clutter mitigation system and technique described herein may be applied to both stationary and moving targets. With respect to moving targets, allowance must be made for detection displacement across CPIs. A highest velocity of sea clutter is approximately the wind speed.

Wind speed depends on sea state:

$v_{max} \sim w_{max}$ (sea state)

Thus, one can map to the number of range bins a PCL detection may move over the course of one (1) CPI:

$$\gamma_{max} = \frac{t_{cpi} v_{max}}{r_{bin}}$$

It is, of course, necessary to allow for polarimetric signature variation across HH and VV. For example, in practical systems it is expected that HH and VV will each miss at least one or more detections on extended targets in some CPIs. To overcome this, one can allow propagation of PCL detections $\delta_n$: maximum pairwise range offset
$n_{CPI}$: CPI criterion
$\gamma_{max}$: detection displacement limit
$n_{prop}$: CPI propagation allowance Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A method for clutter mitigation in a radar system capable of producing detections using RF signals having two orthogonal polarizations, the method comprising:
    processing sets of radar return pulses in each of a first polarization and a second, associated orthogonal polarization to form processed signals, with each set of radar return pulses including one or more pulses;
    performing detections on each processed signal to form a detection set, the detections corresponding to potential targets;
    associating pairs of detections across the first and second polarizations; and
    monitoring displacement of the associated pairs of detections across the first and second polarizations across a sequence of sets of radar return pulses.

2. The method of claim 1 further comprising identifying associated pairs of detections that move with respect to each other over time.

3. The method of claim 2 further comprising removing from the detection set those associated pairs of detections that move at different rates of speed with respect to each other over time.

4. The method of claim 3 further comprising processing those associated pairs of detections that do not move with respect to each other over time to track an object.

5. The method of claim 3 wherein identifying associated pairs of detections that move with respect to each other over time comprises identifying associated pairs of detections that move apart over time as false alarms due to clutter.

6. A method for clutter mitigation in a radar system capable of producing detections using RF signals having two orthogonal polarizations, the method comprising:
    processing sets of radar return pulses in each of a first polarization and a second, associated orthogonal polarization to form processed signals, with each set of radar return pulses including one or more pulses;
    performing detections on each processed signal to form a detection set;
    associating pairs of detections across the first and second polarizations; and
    monitoring displacement of the associated pairs of detections across the first and second polarizations across a sequence of sets of radar return pulses,
    wherein processing sets of radar return pulses in each of a first polarization and a second, associated orthogonal polarization includes averaging sets of radar return pulses in each of the first polarization and the second, associated orthogonal polarization to form averaged signals, and
    wherein performing detections on each processed signal to form a detection set includes performing detections on each averaged signal to form a detection set.

7. A method for mitigating sea clutter in a marine radar system capable of producing detections using RF signals having two orthogonal polarizations (H-H and (V-V), the method comprising:
    processing pulses in a CPI in each of HH and VV to form averaged signals;
    performing CFAR detection on each averaged signal;
    associating pairs of CFAR detections across H-H and V-V; and
    monitoring displacement of the associated pairs of CFAR detections across H-H and V-V across a sequence of CPIs.

8. The method of claim 7 further comprising identifying associated pairs of CFAR detections that move apart over time.

9. The method of claim 8 further comprising filtering out of a detection set those associated pairs of CFAR detections that move apart over time.

10. The method of claim 9 identifying those associated pairs of CFAR detections that move apart over time as false alarms due to sea clutter.

11. The method of claim 10 further comprising providing to a radar tracker those associated pairs of CFAR detections that do not move apart over time.

12. The method of claim 6 further comprising identifying associated pairs of detections that move with respect to each other over time.

13. The method of claim 12 further comprising removing from the detection set those associated pairs of detections that move at different rates of speed with respect to each other over time.

14. The method of claim 13 further comprising processing those associated pairs of detections that do not move with respect to each other over time to track an object.

15. The method of claim 13 wherein identifying associated pairs of detections that move with respect to each other over time comprises identifying associated pairs of detections that move apart over time as false alarms due to clutter.

* * * * *